United States Patent
Seol et al.

(10) Patent No.: US 8,874,826 B2
(45) Date of Patent: Oct. 28, 2014

(54) PROGRAMMING METHOD AND DEVICE FOR A BUFFER CACHE IN A SOLID-STATE DISK SYSTEM

(75) Inventors: Jin-Ho Seol, Seongnam-si (KR); Seung-Ryoul Maeng, Seongnam-si (KR); Jin-Soo Kim, Seongnam-si (KR); Jae-Geuk Kim, Seongnam-si (KR); Hyo-Taek Shim, Seongnam-si (KR); Han-Mook Park, Seongnam-si (KR)

(73) Assignee: OCZ Storage Solutions, Inc., San Jose, CA (US)

( * ) Notice: Subject to any disclaimer, the term of this patent is extended or adjusted under 35 U.S.C. 154(b) by 754 days.

(21) Appl. No.: 13/148,115

(22) PCT Filed: Nov. 30, 2009

(86) PCT No.: PCT/KR2009/007067
§ 371 (c)(1),
(2), (4) Date: Aug. 5, 2011

(87) PCT Pub. No.: WO2010/093114
PCT Pub. Date: Aug. 19, 2010

(65) Prior Publication Data
US 2011/0296089 A1 Dec. 1, 2011

(30) Foreign Application Priority Data
Feb. 11, 2009 (KR) .......................... 10-2009-0011138

(51) Int. Cl.
*G06F 12/02* (2006.01)
*G06F 12/12* (2006.01)
*G06F 12/08* (2006.01)

(52) U.S. Cl.
CPC .......... *G06F 12/121* (2013.01); *G06F 12/0866* (2013.01); *G06F 2212/214* (2013.01); *G06F 12/0246* (2013.01)
USPC ........... 711/103; 711/133; 711/135; 711/156; 711/158; 365/185.33

(58) Field of Classification Search
CPC .............. G06F 12/121; G06F 12/0866; G06F 12/0246; G06F 2212/214
USPC .......................... 711/103, 133, 135, 156, 158; 365/185.33
See application file for complete search history.

(56) References Cited

U.S. PATENT DOCUMENTS

| | | | | |
|---|---|---|---|---|
| 7,660,941 | B2 * | 2/2010 | Lee et al. ....................... | 711/103 |
| 7,934,074 | B2 * | 4/2011 | Lee et al. ....................... | 711/217 |
| 7,966,462 | B2 * | 6/2011 | Lee et al. ....................... | 711/157 |
| 8,108,590 | B2 * | 1/2012 | Chow et al. .................... | 711/103 |
| 8,112,574 | B2 * | 2/2012 | Lee et al. ....................... | 711/103 |
| 8,375,178 | B2 * | 2/2013 | Rana et al. ..................... | 711/154 |
| 2005/0235119 | A1 | 10/2005 | Sechrest et al. | |
| 2006/0271755 | A1 | 11/2006 | Miura | |
| 2007/0091679 | A1 | 4/2007 | Nishihara et al. | |
| 2010/0042776 | A1 * | 2/2010 | Seo et al. ....................... | 711/103 |

* cited by examiner

*Primary Examiner* — Stephen Elmore
(74) *Attorney, Agent, or Firm* — Hartman Global IP Law; Gary M. Hartman; Domenica N. S. Hartman

(57) ABSTRACT

Provided are a method and apparatus for programming a buffer cache in a Solid State Disk (SSD) system. The buffer cache programming apparatus in the SSD system may include a buffer cache unit to store pages, a memory unit including a plurality of memory chips, and a control unit to select at least one of the page as a victim page, based on a delay occurring when a page is stored in at least one target memory chip among the plurality of memory chips.

20 Claims, 4 Drawing Sheets

PROGRAMMING METHOD AND DEVICE FOR A BUFFER CACHE IN A SOLID-STATE DISK SYSTEM

CROSS-REFERENCE TO RELATED APPLICATIONS

This application is the National Stage of International Application No. PCT/KR2009/007067, filed on Nov. 30, 2009, which claims the priority of Korean Patent Application No. 10-2009-0011138, filed on Feb. 11, 2009. The contents of all applications are hereby incorporated by reference in their entirety.

TECHNICAL FIELD

The present invention relates to a method and apparatus for programming a buffer cache in a Solid State Disk (SSD) system, and more particularly, to a programming method and apparatus that may reduce a delay occurring when a page of a buffer cache is stored in a memory including a plurality of memory chips, in an SSD system.

BACKGROUND ART

A storage device for storing data may include, for example, a magnetic disk, a semiconductor memory, and the like. Since physical characteristics are different for each type of storage device, a management method corresponding to the distinctive physical characteristics is required.

Conventionally, magnetic disks are widely used as storage devices. A read/write time of the magnetic disk takes an average of several milliseconds per kilobyte. Additionally, since an arrival time of an arm of the magnetic disk is different, depending on a physical location that stores data, the read/write time of the magnetic disk varies.

Recently, a non-volatile memory that takes a relatively short read/write time, consumes a small amount of power, and occupies a small amount of space, compared with a magnetic disk, is rapidly replacing the magnetic disk. This is because a capacity of the non-volatile memory is increasing.

The non-volatile memory may perform electronic reading, writing, and erasing. The non-volatile memory is a semiconductor memory device that is able to maintain stored data even when power is interrupted. A process of storing data in a non-volatile memory device is additionally referred to as programming, as well as writing.

A typical example of the non-volatile memory includes a flash memory. The flash memory has advantages of a small size, a low power consumption, and a high read rate, when compared with a conventional Hard Disk Drive (HDD). Recently, a Solid State Disk (SSD) using a high-capacity flash memory was proposed to replace an HDD.

The flash memory may typically include, for example, a NAND-type flash memory, a NOR-type flash memory, and the like. A NAND scheme and a NOR scheme may be distinguished based on a configuration and an operating scheme of a cell array.

When a single flash memory is referred to as a flash chip, a multichip using a plurality of flash chips for a large capacity may be configured. In this instance, the plurality of flash chips shares a single data bus. A flash memory has a relatively longer write and erase times in comparison to a transmit time. Accordingly, pipelining is used for the multichip. The pipelining is a technique to perform a write command on a single flash chip, and to simultaneously perform transmission and writing on other flash chips, and has an effect of concealing the write time with respect to the single chip.

A page that is a basic reading and writing unit of a current flash memory, having a size much greater than a sector which is a unit for a basic command received from a host system. Accordingly, when the host system transmits a small unit of write command, a controller generates a single page using a requested sector by reading an original page from a corresponding flash chip through a buffer cache or a flash translation layer. An additional task to rewrite the generated single page in the flash chip is required. However, if the flash chip storing the original page is performing a writing operation, the controller is required to delay reading of the original page until the writing operation is terminated.

DISCLOSURE OF INVENTION

Technical Goals

An aspect of the present invention provides a method and apparatus for programming a buffer cache in a Solid State Disk (SSD) system.

Another aspect of the present invention provides a method and apparatus that may reduce a delay occurring when a page of a buffer cache is stored in a memory including a plurality of memory chips, in an SSD system.

Still another aspect of the present invention provides a method and apparatus that may first store a page that is storable without a delay when storing a page of a buffer cache is stored in a memory including a plurality of memory chips, in an SSD system.

Technical Solutions

According to an aspect of the present invention, there is provided an apparatus for programming a buffer cache in a Solid State Disk (SSD) system, the apparatus including a buffer cache unit to store pages, a memory unit including a plurality of memory chips, and a control unit to select at least one of the pages as a victim page, based on a delay occurring when a page is stored in at least one target memory chip among the plurality of memory chips.

According to another aspect of the present invention, there is provided an apparatus for programming a buffer cache in an SSD system, the apparatus including a buffer cache unit to store pages, a memory unit comprising at least one memory chip, and a control unit to select a new victim page until a victim page that is storable without a delay is selected when the victim page that is selected from the pages in the buffer cache unit is delayed to be stored in a target memory chip in the memory unit.

According to still another aspect of the present invention, there is provided a method of programming a buffer cache in an SSD system, the method including selecting a victim page from pages in a buffer cache unit, and selecting a new victim page until a victim page that is storable without a delay is selected when the victim page is delayed to be stored in a target memory chip in a memory unit.

Effect of the Invention

According to embodiments of the present invention, a method and apparatus for programming a buffer cache in a Solid State Disk (SSD) system that may include a buffer cache unit to store pages, a memory unit including a plurality of memory chips, and a control unit to select at least one of the pages as a victim page, based on a delay occurring when a page is stored in at least one target memory chip among the plurality of memory chips, and that may improve a writing performance by reducing a delay occurring when storing a page of a buffer cache.

BEST MODE FOR CARRYING OUT THE INVENTION

Figure 1:
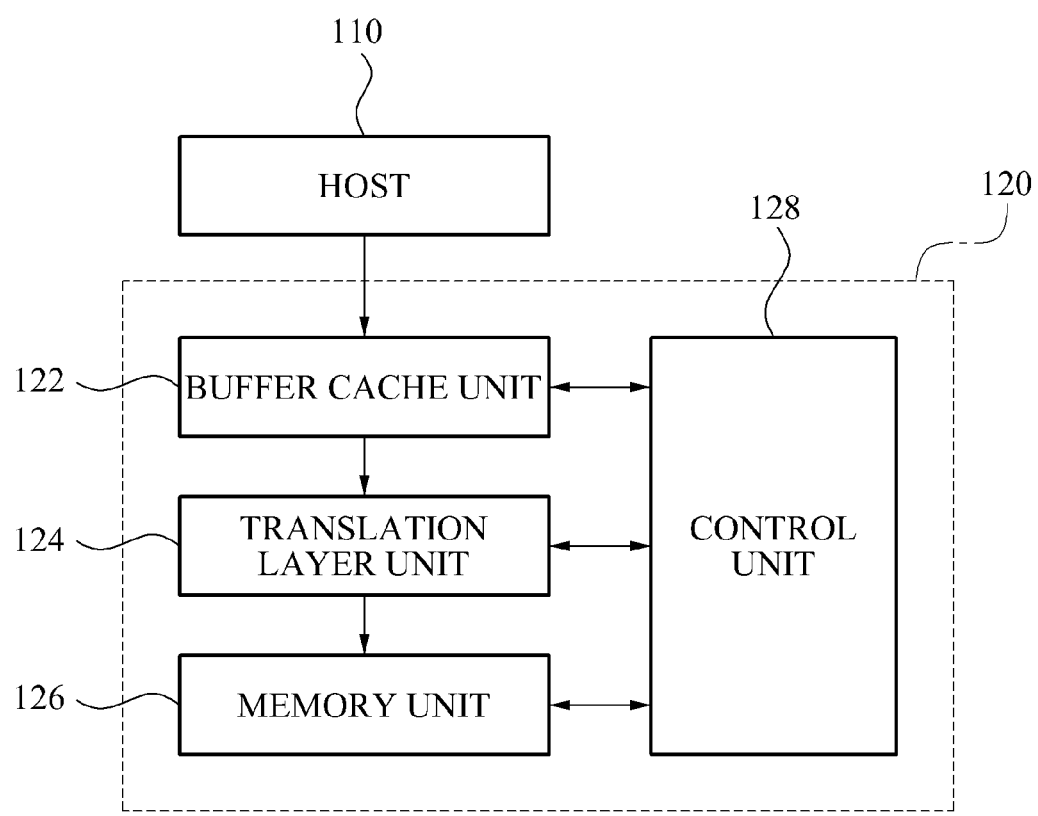
FIG. 1 is a block diagram illustrating a configuration of a Solid State Disk (SSD) system that may store a page of a buffer cache without a delay according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Embodiments of the present invention relate to a programming method and apparatus that may reduce a delay occurring when a page of a buffer cache is stored in a memory including a plurality of memory chips, in a Solid State Disk (SSD) system. A configuration of the SSD system will be described hereinafter with reference to FIG. 1.

FIG. 1 is a block diagram illustrating a configuration of an SSD system 120 that may store a page of a buffer cache without a delay according to an embodiment of the present invention.

Referring to FIG. 1, the SSD system 120 may include a buffer cache unit 122, a translation layer unit 124, a memory unit 126, and a control unit 128.

A host 110 may transfer, to the SSD system 120, a read request or a write request in sector units.

The buffer cache unit 122 may store frequently used data in order to reduce a time expended on a reading operation or a writing operation. The buffer cache unit 122 may be operated exclusively for writing. It be may have an effect of concealing a slow writing performance of the memory unit 126. That is because, when the same request is received again in a short time, the buffer cache unit 122 may immediately process the request, and accordingly the memory unit 126 may not need to be searched.

The translation layer unit 124 may configure a map between a physical sector and a logical sector based on a result of accessing at least one idle bank. That is, the translation layer unit 124 may translate a requested logical address into a corresponding physical address, and may translate the physical address into the logical address. The translation layer unit 124 may also translate a sector unit of a request into a page unit of the request since a basic reading and writing unit of the unit 124 is a page.

The memory unit 126 may include a plurality of memory chips. A configuration of the memory unit 126 will be described hereinafter with reference to FIG. 2.

Figure 2:
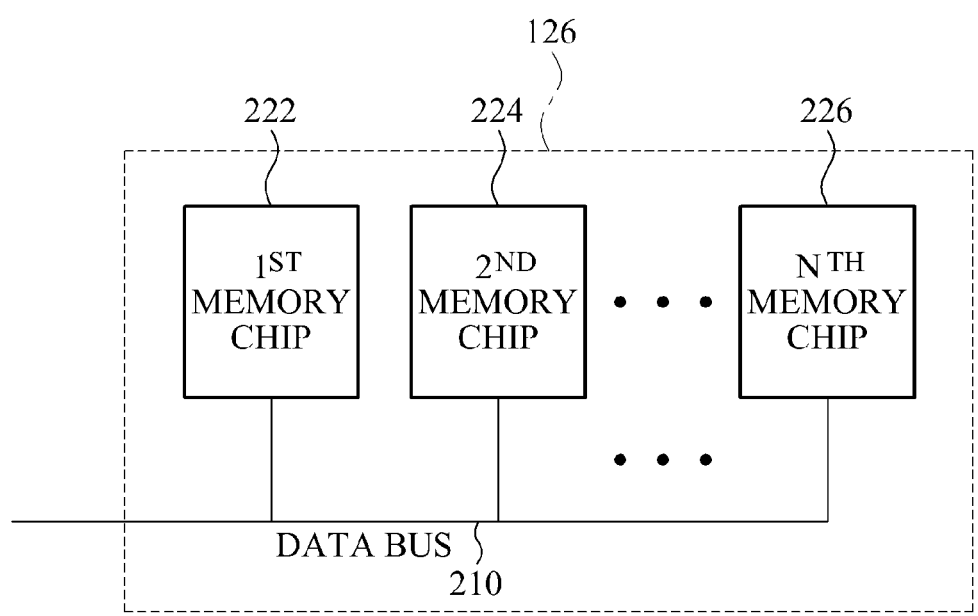
FIG. 2 is a block diagram illustrating a configuration of a memory unit in an SSD system according to an embodiment of the present invention.

FIG. 2 is a block diagram illustrating a configuration of the memory unit 126 in the SSD system 120 according to an embodiment of the present invention.

Referring to FIG. 2, the SSD system 120 may include the memory unit including multiple memory chips 222, 224, and 226, not a single memory chip, due to a desire for a large capacity. The multiple memory chips 222, 224, and 226 may share a single data bus 210.

The memory chips 222, 224, and 226 may correspond to an SSD, and a NAND type flash memory, a NOR type flash memory, or the like may be used as a memory chip. The memory chips 222, 224, and 226 may have relatively longer write and erase times in comparison to a transmit time, and accordingly, pipelining may be used.

However, the memory unit 126 is not limited to the configuration shown in FIG. 2, and may include a plurality of channels, each having a separate data bus. Here, a plurality of memory chips may be connected to any one of the plurality of channels, and the plurality of channels may be independent from one another.

The control unit 128 may control an overall operation of the SSD system 120, and may control the translation layer unit 124. That is, the control unit 128 may perform a function of the translation layer unit 124. In this disclosure, the control unit 128 and the translation layer unit 124 are separately illustrated and described in order to classify each function. Accordingly, when an actual product is produced, the translation layer unit 124 may be configured to be processed by the control unit 128.

When a storage event of the buffer cache unit 122 is sensed, the control unit 128 may select a target memory chip from idle memory chips which are memory chips available. In this instance, the control unit 128 may select, as the target memory chip, a chip having a largest available storage space from idle memory chips in the memory unit 126. That is, a memory chip having most free pages (available pages) among the idle memory chips may be selected as the target memory chip.

The control unit 128 may classify a sector unit of data stored in the buffer cache unit 122 in page units, and may select a page that has not been used for a longest time, as a victim page to be stored in the target memory chip. The victim page may refer to a page to be stored in a memory chip.

When the selected victim page is delayed to be stored in the target memory chip in the memory unit 126, the control unit 128 may select a new victim page until a victim page that may be storable without a delay is selected.

The case in which the victim page is delayed may correspond to a case in which the victim page is a partial page, and a memory chip that stores an original page of the victim page is in use. The partial page may refer to a case in which data stored in the buffer cache unit 122 corresponds to partial data, instead of the entire data constituting the page.

When the victim page corresponds to the entire page, the victim page may be stored without a delay. When the victim page corresponds to a partial page, and a memory chip that stores an original page of the victim page is not in use, the victim page may also be stored without a delay. The entire page may refer to a case in which data stored in the buffer cache unit 122 corresponds to the entire data constituting the page.

When the victim page corresponds to a partial page, and a memory chip that stores an original page of the victim page is not in use, the control unit 128 may store the original page of the victim page in the target memory chip by reading the original page from the memory unit 126 and combining the victim page with the original page.

When the victim page corresponds to the entire page, the control unit 128 may store the victim page in the target memory chip.

When the victim page that may be storable without a delay is unavailable in the selected target memory chip, the control unit 128 may select a new target memory chip from memory chips in the memory unit 126, and may select a new target page until a victim page that may be storable without a delay is selected.

Figure 3:
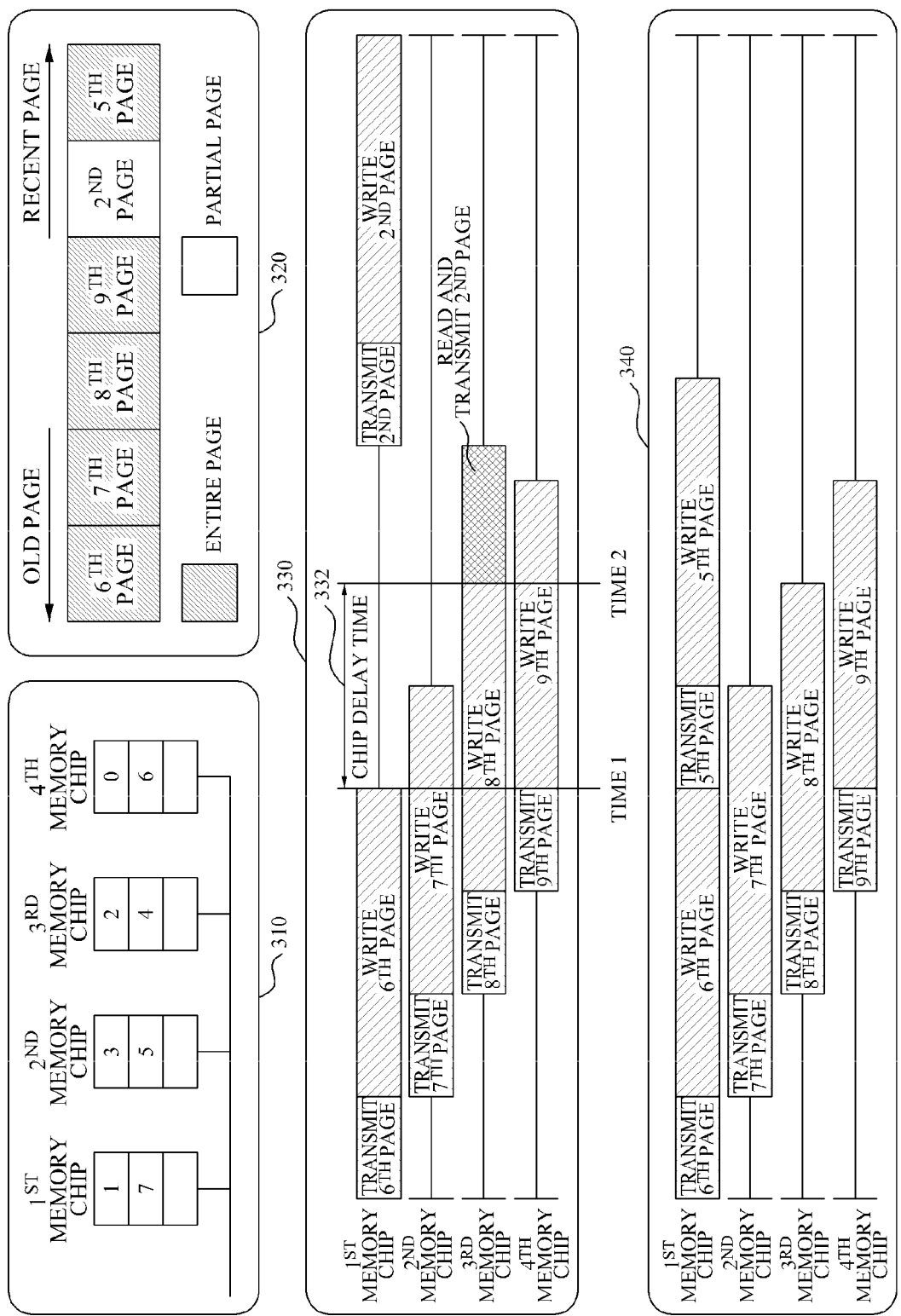
FIG. 3 is a diagram illustrating an example of storing a page of a buffer cache without a delay in an SSD system according to an embodiment of the present invention, in comparison to a conventional method.

FIG. 3 is a diagram illustrating an example of storing a page of a buffer cache without a delay in an SSD system according to an embodiment of the present invention, in comparison to a conventional method.

Referring to FIG. 3, pages may be stored in sequence as illustrated in FIG. 3, in a memory unit 310 including four memory chips.

The plurality of pages may be stored in a buffer cache unit 320, and a leftmost page may correspond to an oldest page, and a sequence of storing a page may start from left to right. In this instance, a page in a shaded area may refer to the entire page, and a page in an un-shaded area may refer to a partial page.

Referring to a timing diagram 330 of a conventional and general storage method, an SSD system may transmit a sixth page corresponding to the entire page to a first memory chip, may transmit a seventh page to a second memory chip while the first memory chip is writing the sixth page, and may transmit an eighth page to a third memory chip while the second memory chip is writing the seventh page. Thus, the SSD system may transmit idle pages corresponding to the sixth page through the ninth. That is, the sixth page, the seventh page, the eighth page, and the ninth page corresponding to the entire page may be sequentially transmitted via a data bus.

The SSD system may check the memory unit 310 before storing the second page corresponding to the partial page. As a result, it may be verified that the third memory chip that stores the entire page of the second page may be in use. Accordingly, the SSD system may stand by during a chip delay time 332 until the third chip is not in use. The SSD system may read the entire page of the second page, combine the entire page of the second page with a partial page of the second page, transmit the combined second page in order to store the second page, and store the fifth page corresponding to the entire page.

Referring to a timing diagram 340 of the storage method according to an embodiment of the present invention, the second page may correspond to a page that may need a delay, and accordingly the fifth page that may not need a delay may be stored first. After the fifth page is stored, when the third memory chip is in use and a page that is storable without a delay is unavailable, the SSD may store the second page after a delay, by combining the partial page of the second page with the entire page of the second page. However, after the fifth page is stored, when the third memory chip is not in use, the SSD system may store the second document without a delay in an idle memory chip by combining the entire page of the second page and the partial page of the second page.

A method of programming a buffer cache in the SSD system that is configured as described above will be described hereinafter with reference to FIG. 4.

Figure 4:
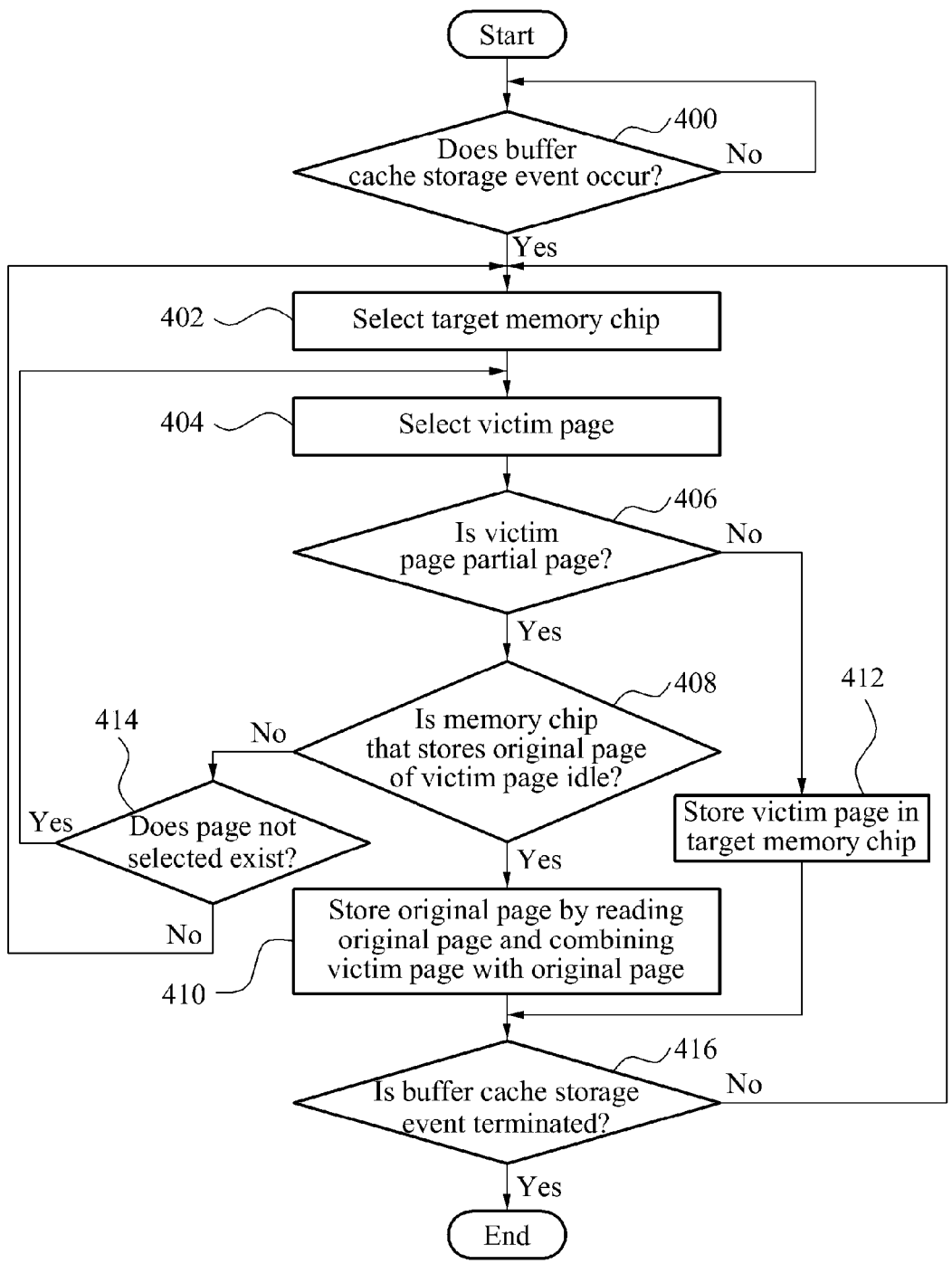
FIG. 4 is a flowchart illustrating a process of storing a page of a buffer cache without a delay in a SSD system according to an embodiment of the present invention.

FIG. 4 is a flowchart illustrating a process of storing a page of a buffer cache without a delay in an SSD system according to an embodiment of the present invention.

Referring to FIG. 4, when a buffer cache storage event is sensed in operation 400, the SSD may select a target memory chip from idle memory chips that have not been selected, in operation 402. In this instance, a chip having a largest available storage space from the idle memory chips in the memory unit may be selected as the target memory chip. That is, a memory chip having most free pages among the idle memory chips may be selected as the target memory chip.

In operation 404, the SSD may select a page that has not been used for a longest time among the pages that have not been selected, as a victim page to be stored in the target memory chip.

In operation 406, the SSD may verify whether the victim page corresponds to a partial page. When the victim page corresponds to the entire page as a result of the verification, the SSD may store the victim page in the target memory chip in operation 412, and may proceed with operation 416.

When the victim page corresponds to the partial page as the result of the verification in operation 406, the SSD may verify whether a memory chip that stores an original page of the victim page is idle in operation 408.

When the memory chip that stores the original page of the victim page is idle as the result of the verification in operation 408, the SSD may store the original page of the victim page in the target memory chip by reading the original page and combining the victim page with the original page in operation 410, and may proceed with operation 416.

In operation 416, the SSD may verify whether the buffer cache storage event is terminated. When the storage event occurs continuously as the result of the verification in operation 416, the SSD may return to proceed with operation 402. However, when the storage event is terminated, the SSD may terminate the algorithm according to an embodiment of the present invention.

When the memory chip that stores the original page of the victim page is in use as the result of the verification in operation 408, the SSD may verify whether a page, that has not been selected and is to be stored in the selected target memory chip, exists in the buffer cache, in operation 414.

When the page that has not been selected exists as the result of the verification in operation 414, the SSD may return to operation 404 to select a new victim page, and may perform the series of processes.

However, when the page that has not been selected is absent as the result of the verification in operation 414, the SSD may return to operation 402 to select a new target memory chip, and may perform the series of processes.

The embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for programming a buffer cache in a Solid State Disk (SSD) system, the apparatus comprising:
    a buffer cache unit to store pages;
    a memory unit comprising a plurality of memory chips; and
    a control unit to select at least one of the pages as a victim page, based on a delay occurring when a page is stored in at least one target memory chip among the plurality of memory chips.

2. The apparatus of claim 1, wherein the control unit selects the victim page based on a usage frequency of the pages or the most recent usage of the pages.

3. The apparatus of claim 1, wherein the control unit selects, as the victim page, a page that has not been selected as the victim page, has not been used for a longest time, and is storable in the target memory chip without a delay.

4. The apparatus of claim 3, wherein a case in which the victim page is delayed corresponds to a case in which the victim page is a partial page, and a memory chip that stores an original page of the victim page is in use.

5. The apparatus of claim 3, wherein the victim page that is storable without the delay corresponds to a case in which the victim page is the entire page, or a case in which the victim page is a partial page, and a memory chip that stores an original page of the victim page is not in use.

6. The apparatus of claim 1, wherein the control unit stores an original page of the victim page in the target memory chip by reading the original page and combining the victim page with the original page when the victim page is a partial page, and a memory chip that stores the original page of the victim page is not in use.

7. The apparatus of claim 1, wherein the control unit stores the victim page in the target memory chip when the victim page is the entire page.

8. The apparatus of claim 1, wherein the control unit selects, as the target memory chip, a chip having a largest available storage space from idle memory chips in the memory unit before selecting the victim page.

9. The apparatus of claim 1, wherein the control unit selects a new target memory chip from memory chips in the memory unit when the victim page that is storable without the delay is unavailable as a result of selecting a new victim page.

10. An apparatus of programming a buffer cache in a Solid State Disk (SSD) system, the apparatus comprising:
    a buffer cache unit to store pages;
    a memory unit comprising at least one memory chip; and
    a control unit to select a new victim page until a victim page that is storable without a delay is selected when the victim page that is selected from the pages in the buffer cache unit is delayed to be stored in a target memory chip in the memory unit.

11. The apparatus of claim 10, wherein the control unit selects, as the victim page or the new victim page, a page that has not been selected as a target to be stored, and has not been used for a longest time, from the pages in the buffer cache unit.

12. The apparatus of claim 10, wherein a case in which the victim page is delayed corresponds to a case in which the victim page is a partial page, and a memory chip that stores an original page of the victim page is in use.

13. The apparatus of claim 10, wherein the victim page that is storable without the delay corresponds to a case in which the victim page is the entire page, or a case in which the victim page is a partial page, and a memory chip that stores an original page of the victim page is not in use.

14. The apparatus of claim 10, wherein the control unit stores an original page of the victim page in the target memory chip by reading the original page and combining the victim page with the original page when the victim page is a partial page, and a memory chip that stores the original page of the victim page is not in use.

15. The apparatus of claim 10, wherein the control unit selects, as the target memory chip, a chip having a largest available storage space from idle memory chips in the memory unit before selecting the victim page.

16. A method of programming a buffer cache in a Solid State Disk (SSD) system, the method comprising:
    selecting a victim page from pages in a buffer cache unit; and
    selecting a new victim page until a victim page that is storable without a delay is selected when the victim page is delayed to be stored in a target memory chip in a memory unit.

17. The method of claim 16, wherein the selecting of the victim page or the selecting of the new victim page comprises selecting, as the victim page or the new victim page, a page that has not been selected as a target to be stored, and has not been used for a longest time, from the pages in the buffer cache unit.

18. The method of claim 16, wherein a case in which the victim page is delayed corresponds to a case in which the victim page is a partial page, and a memory chip that stores an original page of the victim page is in use.

19. The method of claim 16, wherein the victim page that is storable without the delay corresponds to a case in which the victim page is the entire page, or a case in which the victim page is a partial page, and a memory chip that stores an original page of the victim page is not in use.

20. The method of claim 16, further comprising, if the victim page that is storable without the delay is selected:
    storing an original page of the victim page in the target memory chip by reading the original page and combining the victim page with the original page when the victim page is a partial page, and a memory chip that stores the original page of the victim page is not in use.

* * * * *